Figure 1:
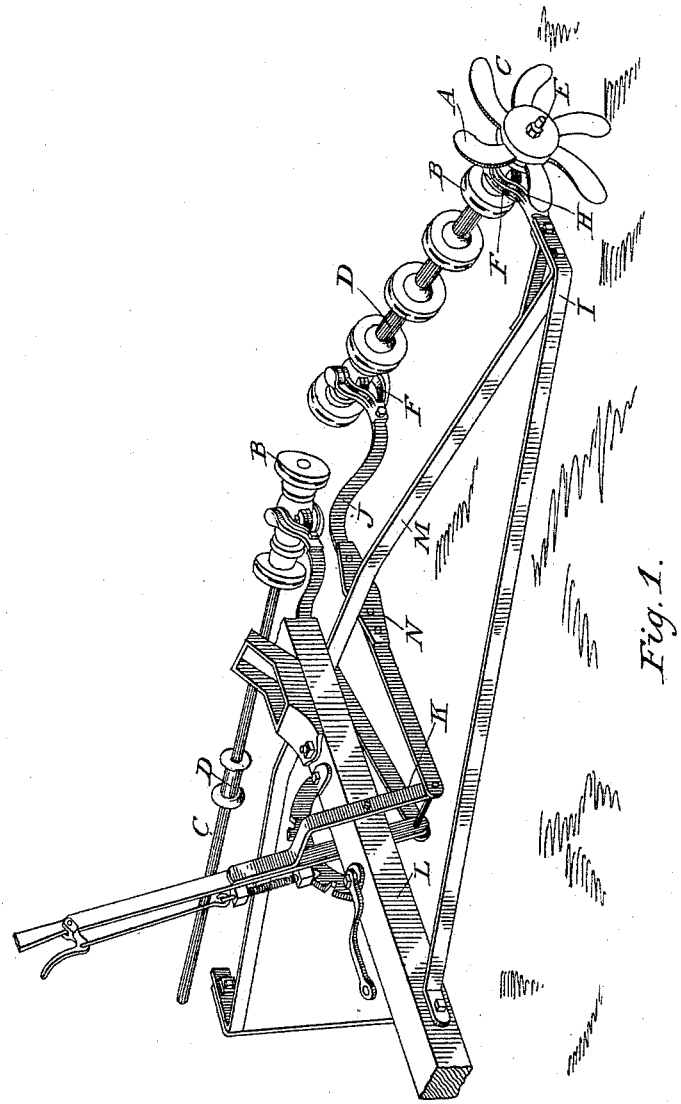

(No Model.)

C. LA DOW.
HARROW.

No. 488,943.

2 Sheets—Sheet 1.

Patented Dec. 27, 1892.

Witnesses.
John Hourigan
Charles Leekuk

Charles La Dow
Inventor.
per
Baldwin Davidson & Wright
Attorneys.

THE NORRIS PETERS CO., PHOTO-LITHO., WASHINGTON, D. C.

(No Model.) 2 Sheets—Sheet 2.
C. LA DOW.
HARROW.
No. 488,943. Patented Dec. 27, 1892.
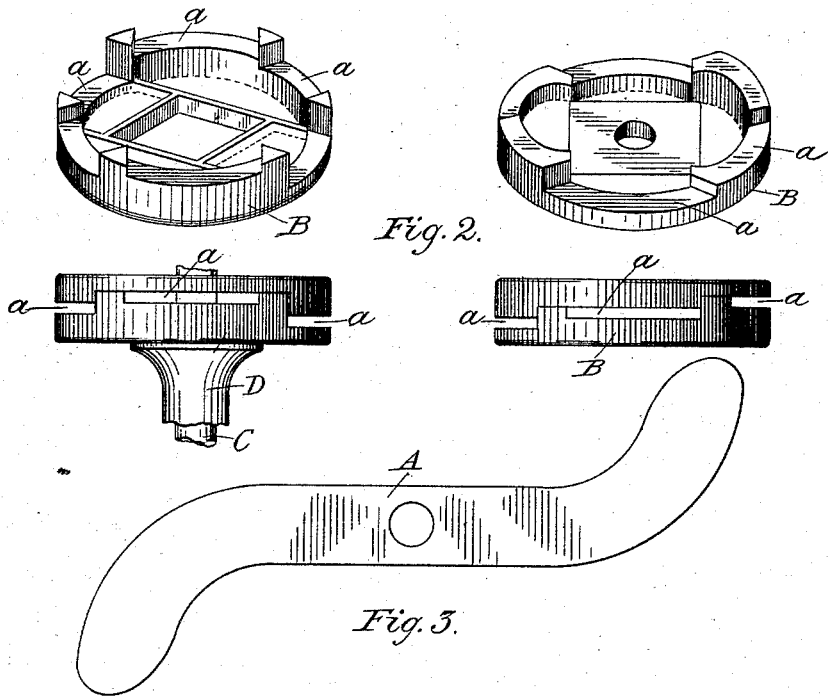
Fig. 2.
Fig. 3.
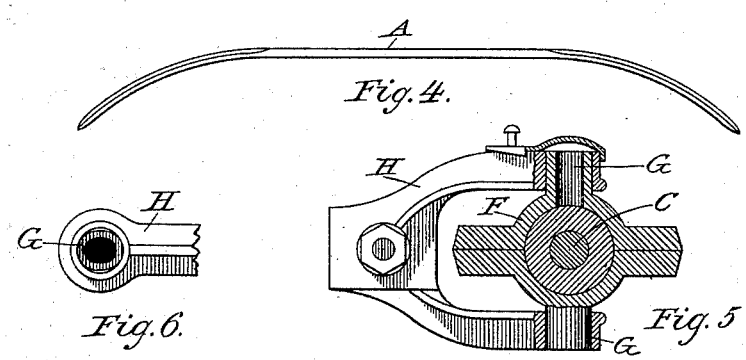
Fig. 4.
Fig. 6. Fig. 5.
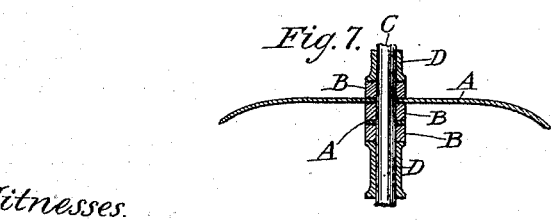
Fig. 7.
Witnesses. Charles La Dow, Inventor.
per
Baldwin Davidson & Wright
Attorneys.

UNITED STATES PATENT OFFICE.

CHARLES LA DOW, OF ALBANY, NEW YORK.

HARROW.

SPECIFICATION forming part of Letters Patent No. 488,943, dated December 27, 1892.

Application filed July 29, 1891. Serial No. 401,050. (No model.) Patented in Canada January 20, 1891, No. 35,846.

*To all whom it may concern:*

Be it known that I, CHARLES LA DOW, a citizen of the United States, residing at Albany, in the county of Albany and State of New York, have invented certain new and useful Improvements in Harrows, (for which I have received Letters Patent in Canada, No. 35,846, dated January 20, 1891,) of which the following is a specification.

The object of the invention is, first, to so shape the blades of the harrow that they will act on the soil as nearly spade-like as possible, and will not become clogged; secondly, to arrange simple means for securing the blades together; thirdly, to arrange the journals supporting the blade-spindle so that they will permit a slight vertically-rocking movement of the said spindle, and, fourthly, to provide means by which the gangs of blades are held to their word.

The invention consists, essentially, first, of two or more concaved S-shaped blades arranged on a spindle and clamped together; secondly, of two or more concaved S-shaped blades arranged on a spindle and clamped together between two disks, the face of each disk being stepped so that each side of each blade shall be in contact with a portion of the face of a disk; thirdly, of a journal-box supporting the blade-spindle and having trunnions which fit into oval holes made in a forked projection fixed to the frame of the machine; fourthly, of a curved drag-bar or drag-bar having a curved plate thereon arranged to abut on the frame of the machine above the said curve so as to be in constant contact therewith.

Figure 1 is a perspective view of my improved harrow. Fig. 2 represents details of the disks by which the blades are clamped together. Fig. 3 is a side view of a blade. Fig. 4 is a edge view of a blade. Figs. 5 and 6 are details showing the journal-box. Fig. 7 is a section showing the manner of securing the blades to the spindle.

On reference to Figs. 1, 3 and 4, it will be observed that each blade A, is concaved, and is made S-shape in form. When blades of this form are arranged together as indicated in Fig. 1, they act on the soil spade fashion, raising and turning the soil over in a perfect manner, and as each blade leaves the ground, any weeds or soil which may have clung to it will naturally slide off, owing to the shape of the blade as stated. In this way the blades remain practically quite clear of soil, and the evil effect of clogging is overcome.

On reference to Fig. 2, it will be observed that the faces of the disks B, have a series of steps, *a*, made in them, the depth of each step being made to correspond with the thickness of the blades A. The blades A, when arranged between the two disks, B, lay on top of each other, and the step face of each disk lies in contact with the blade next to it, and the projections formed by the steps interlock each other and securely hold the blades in the position in which they are set. The disks B, with their blades A, are placed upon the spindle C, and a spool D, is placed on the said spindle C, between each pair of disks, B. By this arrangement it is merely necessary to tighten the nut E, on the spindle C, in order to clamp all the disks together and prevent them revolving on the said spindle. The tightening of the said nut also securely clamps the blades A, between their respective disks. Each end of the spindle C, is supported by a journal-box F, which journal-box has trunnions, G, to fit into the oblong holes made in the forked projection H, which is attached to or formed upon the frame I, of the machine. On reference to Fig. 6, the oval hole referred to will be noticed. By thus leaving play on each side of the trunnions, G, the spindle C, may be rocked vertically. The inner ends of the spindles C, are connected, as indicated, to the drag-bars J, which drag-bars also connected to the lever K, pivoted on the tongue L, and designed to adjust the angle of the said spindles. M, is a bar attached to and forming part of the frame I, which bar extends over the drag-bars J. This bar M, is intended to remain in contact with the drag-bars so as to prevent the inner ends of the spindles C, being raised by the blades A, coming in contact with hard soil. In this way the blades are held to their work. The angling of the lever K, while being moved to adjust the angle of the spindle C, will necessarily raise or lower the drag-bars J, and as it is important for the satisfactory working of the machine that the drag-bars should be in constant contact with the bar M, I have placed a plate or projection N, extending above the upper edge of each drag-bar J, and have tapered the said plate or projection from its center to each end, the said taper being made to suit the rise and fall of the drag-bar caused by the action of the operating lever. The plates may be omitted and the bar may be curved, so as to answer the same purpose as the plates.

What I claim as my invention, is—

1. In a harrow, two or more concaved S-shaped blades arranged on a spindle and clamped together between two disks, substantially as and for the purpose specified, in combination with a draft frame.

2. In a harrow, two or more concaved S-shaped blades arranged on a spindle and clamped together between two disks, the face of each disk being stepped so that the blades shall be in contact with each other, and each blade in contact with the stepped face of a disk, substantially as and for the purpose specified, in combination with a draft frame.

3. In a harrow, a journal-box supporting the blade to the spindle and having trunnions which fit into oval holes made in a forked projection fixed to the frame of the machine, substantially as and for the purpose specified.

4. In a harrow, a rotary gang of cutters, a drag-bar attached to said gang and having a curve on the upper ed aid bar, in combination with a bar extending over the said curve, substantially as and for the purpose specified.

In testimony whereof I have hereunto subscribed my name.

CHARLES LA DOW.

Witnesses:
ALFRED W. SKINNER, Jr.,
M. WHITE.